United States Patent [19]

Laurent et al.

[11] Patent Number: 4,616,703
[45] Date of Patent: Oct. 14, 1986

[54] DEVICE FOR ANCHORING A PROBE IN A WELL, BY OPENING MOBILE ARMS

[75] Inventors: Jean Laurent, Orgeval; André Fabre, Saint-Cloud, both of France

[73] Assignee: Institut Francais du Petrole, France

[21] Appl. No.: 625,969

[22] Filed: Jun. 29, 1984

[30] Foreign Application Priority Data

Jul. 6, 1983 [FR] France .................. 83 11383

[51] Int. Cl.⁴ ............................................ E21B 23/04
[52] U.S. Cl. .................................. 166/66.4; 166/214
[58] Field of Search ............ 166/212, 214, 136, 65 M, 166/65 R, 55.8, 120, 122, 66.4; 175/274, 275, 271, 290, 291

[56] References Cited

U.S. PATENT DOCUMENTS 2,490,350 12/1949 Grable ............................ 166/212 X
2,667,223 1/1954 Farris ............................ 166/65 M X
3,052,297 9/1962 Blydorp ........................... 166/136 X
3,664,416 5/1972 Nicolas et al. ..................... 166/66.4
4,407,329 10/1983 Huebsch et al. ............ 166/65 M X Primary Examiner—James A. Leppink
Assistant Examiner—Matthew Smith
Attorney, Agent, or Firm—Antonelli, Terry & Wands

[57] ABSTRACT

A device for anchoring a probe in a well by opening at least one arm pivotable with respect to the body of the probe by a spring moving a rod in a guide housing of the body and operating arms. In a closed position of the arm, the rod is locked by a bolt and a hydraulic fluid contained in a chamber and maintained at the same pressure as the pressure external to the probe is used for driving the bolt, when the pressure of this fluid is applied thereto intermittently by an electromagnetic valve.

6 Claims, 2 Drawing Figures

DEVICE FOR ANCHORING A PROBE IN A WELL, BY OPENING MOBILE ARMS

BACKGROUND OF THE INVENTION

The present invention relates to a device for anchoring a probe lowered into a wall, by opening mobile arms, which come to bear against the well thereof.

More particularly, the invention relates to a device for anchoring, by opening mobile arms, a probe equipped with measuring means lowered into a well for studying the geological formations encountered or for carrying out seismic prospection operations, probe being fixed at the end of a multifunction cable containing electric wires and signal transmission lines between the measuring apparatus and a surface installation.

In, for example, French Patent Application No. 2,501,380, a system for anchoring devices lowered at the end of a cable into holes or wells drilled in the ground is proposed which includes at least one one pivoting arm associated with drive means, which drive means may comprise for example, hydraulic jacks for actuating the arms. The hydraulic jacks communicate through a hydraulic circuit, with a cylinder in which a piston is sealingly drives by, for example, an electric motor.

The drive means may, as proposed in French Pat. Nos. 2,052,062 and 2,138,335, also be formed by springs adapted, by extending, to move the anchorage arms apart, the extension movement of the springs being opposed by mechanical elements movable under the action of a hydraulic system contained in the body of the probe and actuated from the surface installation.

In accordance with the present invention, an anchorage device comprises at least one spring, a rod driven in translation by the expansion of the spring, means for transforming the translational movement of the rod into a pivoting movement of the anchorage arms and means for intermittently immobilizing the rod in the compression position of the spring, with the the immobilization means comprising a bolt adapted to a radial recess in the rod in the compression position of the spring, and hydraulic means for moving the bolt.

The hydraulic means may comprise a cavity formed in the body of the apparatus, a head firmly secured to the bolt in translation and adapted to slide in the cavity, and a hydraulic circuit for intermittently applying unequal pressures to the two opposite faces of the head, with one of the pressures being equal to the pressure existing in the well at the chosen depth where the apparatus is immobilized. The application of the two unequal pressures is effected by, for example, an electromagnetic valve.

Since the device is most frequently used at a depth of several hundred meters where the pressure is very high, the force to which the bolt is subjected, due to the differential pressure applied to the piston, is considerable and provides a very reliable and very clean tripping of the opening of the arm.

Moreover, this high tripping force is obtained without using an independent pressurized fluid generator driven by an electric motor requiring a considerable electrical power supply.

Since the control system is formed essentially by an electromagnetic valve, the electric power supply of the probe is simplified.

It should also be emphasised that the force for opening the arm, which is linked to an overpressure occurring solely during lowering of the apparatus into the well, is zero at the surface and that accidental arm tripping after compression of the spring and locking is impossible as long as the apparatus is not in its normal conditions of use.

BRIEF DESCRIPTION OF THE DRAWINGS

Other features and advantages of the device of the invention will appear from reading a description of a preferred but non limiting embodiment with reference to the accompanying drawings in which.

DETAILED DESCRIPTION

Figure 1:
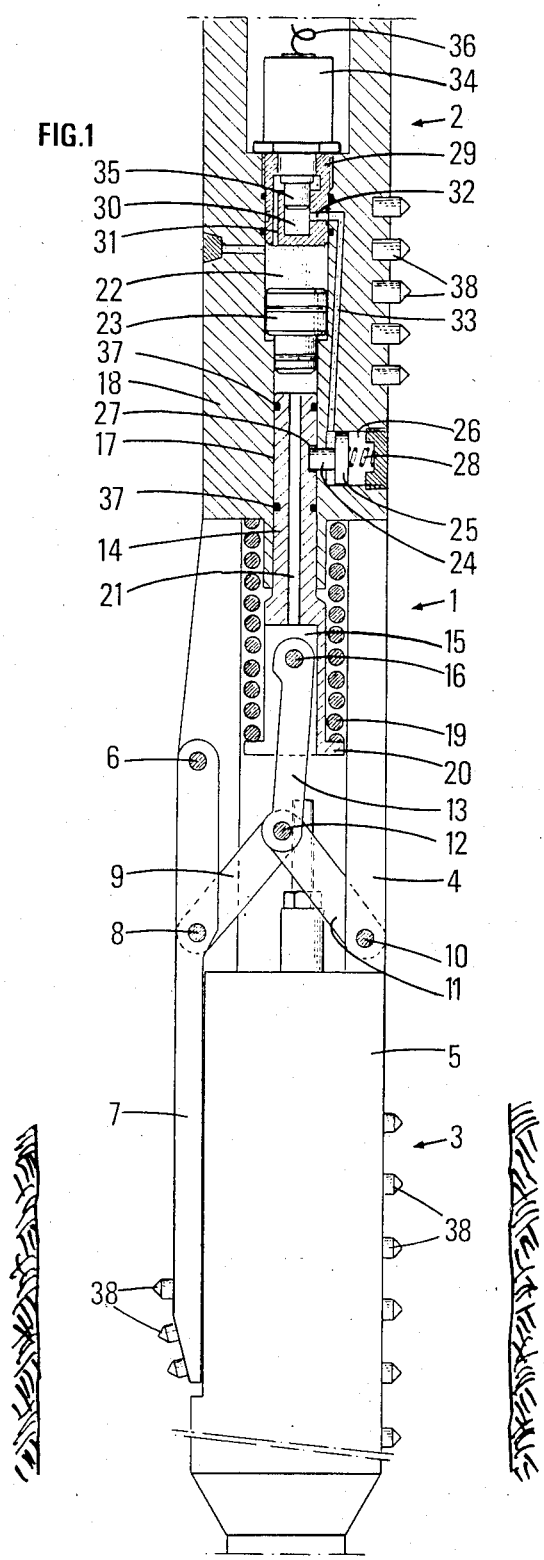
FIG. 1 shows a partial cross-sectional view of an anchorage device in the closed and locked position of the pivoting arm, with an upper part of the probe and a multifunction support cable not being shown.
Figure 2:
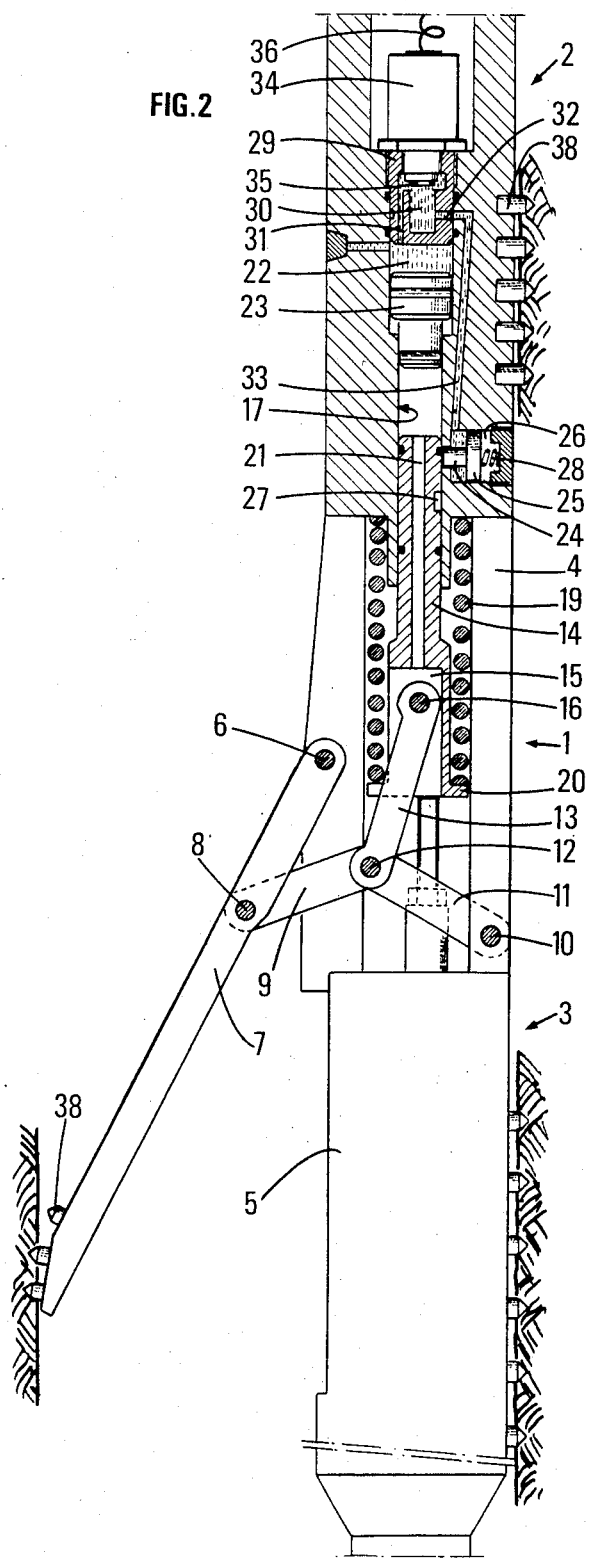
FIG. 2 shows the same partial view of the anchorage device of FIG. 1 in a tripped position.

Referring now to the drawings wherein like reference numerals are used throughout the various views to designate like parts and, more particularly, to FIGS. 1 and 2, according to these figures, an anchorage device is associated with a tubular probe generally designated by the reference numeral 1 comprising an upper part generally designated by the reference numeral 2 and a lower part generally designated by the reference numeral 3 interlocked with each other by several bars 4.

The measuring apparatus, formed of, for example, geophones, is contained in a compartment 5 in the lower part 3 and is connected to the multifunction cable supporting the probe 1 by electric conductors (not shown) passing, for example, inside bars 4.

One of the bars 4 comprises a pin 6 about which an anchorage arm 7 may pivot. On a pin fixed to the anchorage arm 7 at a certain distance from pin 6 is pivotably mounted a first end of a first operating arm 9. On a pin 10, fixed to another bar 4, is pivotally mounted a first end of a second operating arm 11. The second ends of the two operating arms 9, 11 may pivot with respect to a common pin 12. On the common pin 12 may also pivot a first end of a third operating arm 13.

The anchorage device also comprises a rod 14 having a recess 15 at the bottom of which is fixed a pivot pin 16 for the second end of the third operating arm 13. The rod 14 may slide in a cylindrical guide housing 17 formed in the axis of body 18 of the probe 1.

A helical spring 19 bearing at a first end on the body of the probe 1 and at a second end on a shoulder 20 of rod 14 exerts on this latter a force tending to cause it to leave its guide housing 17. A passage 21 passing through rod 14 along its axis allows the upper part of the guide housing 17 to be placed at the same pressure as existing outside the probe 1.

The upper part of housing 17 is extended by a chamber 22 of greater section containing a hydraulic liquid. A piston 23 is adapted for sealingly sliding in chamber 22 and the upper part of the guide housing 17 under the action of the possible pressure difference between the pressure of the hydraulic liquid and that reigning in the well, so as to cancel out this pressure difference.

The device further comprises a bolt 24 having a head 25 of larger section movable inside a cylindrical cavity 26 formed radially in the body 18 of the probe, between a retracted position where the bolt is retracted entirely inside said body and an extended position where it projects inside the guide housing 17. A recess 27 is formed radially in rod 14 for bolt 24. The bolt is pushed towards its advanced position by a spring 28 placed in cavity 26 and bearing on the head 25.

The dimensions of the operating arms and the location of the pivot pins 8, 10, 12 and of housing 27 are chosen so that, when the anchorage arm 7 is in the closed position along the body of the probe, the helical spring 19 is set and the bolt is engaged in recess 27.

The end of chamber 22, opposite the guide housing 17, is closed by a threaded plug 29 having an axial cavity 30 communicating with the inside of chamber 22 through a passage 31 and with cavity 26 through a second passage 32 and a passage 33 formed inside the body of the probe, which opens into cavity 26 on the side thereof the nearest to the guide housing 17.

At the upper part of the threaded block 29 is fixed an electromagnetic valve 34 acting on a piston 35 adapted for sealing sliding in the axial cavity 30 between an extended position in which passages 31, 32 are isolated from each other and a retracted position where these same passages are in communication.

Conducting wires 36 are connected in the upper part 2 of the probe 1 to a multifunction cable (not shown) which connects the cable to the surface installation and allows the electromagnetic valve 34 to be actuated thereby enabling the piston 35 to be moved at will to a retracted position or an extended position. Seals 37 are disposed at the periphery of rod 40 for sealingly isolating the bolt 24 from guide housing 17 and from the outside of the probe 1.

Projecting elements 38 are fixed to the end of the anchorage arm 7 and to the wall of the probe 1 which is opposite thereto, so as to improve the coupling when the arm and the wall are in contact with the walls of the well.

In one embodiment, the pressure required for tripping the arm is twenty-five bars obtained at a depth of 250 meters.

The device operates in the following way:

With probe 1 on the surface, the anchorage arm 7 is in its closed position against the wall of the body (FIG. 1), the helical spring 19 is compressed by retraction of a rod 14 inside its guide housing 17 and bolt 24 is pushed by spring 28 out of its cavity and is engaged in the recess 27 in rod 14. The electromagnetic valve 34 is actuated so as to bring piston 35 into its rectracted position (shown in FIG. 2) so that the pressures on each side of head 25 of the bolt 24 are identical and equal to the external atmospheric pressure, then the piston 35 is brought into its projected position (FIG. 1) so as to isolate the inside of the axial cavity 30 of block 29 from the external medium.

The probe 1 is then lowered into the well and, as it is lowered, the outside pressure gradually increases. The retraction of the free piston 23 inside chamber 22 under the action of this pressure, applied thereto through the axial pressure 21, equalizes the pressure of the hydraulic liquid contained in chamber 22 at all times with that existing in the well.

When the probe 1 has reached the chosen depth where it is to be anchored, the electromagnetic valve 34 is actuated so that piston 35 retracts (FIG. 2) and places passages 31 and 32, 33 in communication. The pressure of the hydraulic liquid which, because of the free piston 23, is equal to the pressure outside the probe 1 is applied to the head 25 of bolt 24 and this latter is driven to its retracted position (FIG. 2). Rod 14 is thus freed and, under the action of the helical spring 19, is pushed outside its guide housing 17. The pivoting movement of the operating arms 9, 11, 13, resulting from this movement, causes the anchorage arm 7 to pivot and, when it comes into engagement with the wall, causes probe 1 to be pressed against the opposite wall of the well. The apparatus contained in the probe 1 may then be used.

Still within the scope of the invention, the same hydraulic system may be used for controlling the simultaneous unlocking of several anchorage arms such as the anchorage arm 7.

What is claimed is:

1. An anchorage device for immobilizing an apparatus lowered into a well by outwardly opening at least one anchorage arm which may pivot with respect to the apparatus, the anchorage device comprising a body, at least one spring, disposed in said body, a movable rod slidably positioned in said body and driven in translation by the expansion of the spring, means connecting said rod to the anchorage arm for transforming the translational movement of the rod into a pivoting movement of the anchorage arm and releasable means for immobilizing the rod in a compression position of the spring, said releasable means comprising a bolt and means for pushing the bolt into engagement in a radial recess in the rod in the compression position of the spring, said anchorage device also comprising hydraulic means for moving the bolt out of engagement with the rod and releasing the rod, said hydraulic means including a cavity formed in the body of the apparatus, a head firmly secured to the bolt with a larger section than said bolt and adapted for sliding in said cavity, and a hydraulic circuit for intermittently applying a fluid to said bolt a pressure which is substantially constantly equal to the pressure prevailing in the well, thereby disengaging the bolt from the rod.

2. The anchorage device as claimed in claim 1, wherein said means for pushing the bolt comprises a second spring and a second fluid at a pressure lower than a pressure of the fluid in the hydraulic circuit, said second fluid being confined in a closed cavity of said apparatus.

3. The anchorage device as claimed in claim 2, wherein said hydraulic circuit comprises a passage opening into the cavity on the side thereof nearest to the rod and an electromagnetic valve associated with a piston for placing said passage in communication with a chamber containing said fluid under pressure and closed at one end by a free piston freely slidable in said chamber, said free piston being subjected on its face external to the chamber to the pressure existing in the well.

4. The anchorage device as claimed in claim 3, wherein said rod comprises an axial passage communicating the chamber with the outside of the device and the means for transforming the translational movement of the rod into a pivoting movement of the arm comprises two operating arms secured at one of their ends respectively to the anchorage arm and to the body of the device and at their other end to a third operating arm integral with said rod in translation.

5. The device as claimed in claim 4, wherein the piston associated with said electromagnetic valve is movable in an axial cavity formed in a piece added at the end of the chamber opposite said axial passage, said piston being movable between an extended position in which the cavity formed in the body of the device for the head of the bolt is isolated from the chamber and a retracted position in which this cavity and the chamber are in communication.

6. The device as claimed in claim 1, wherein the anchorage arm and the body of the device, on the side opposite the anchorage arm, comprise projecting elements for improving the coupling of the apparatus to the walls of the well.

* * * * *